E. F. PARKER & J. SMEAD.
MANUFACTURE OF MILK PANS.
No. 16,752. Patented Mar. 3, 1857.
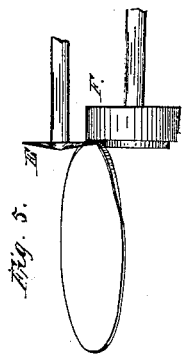
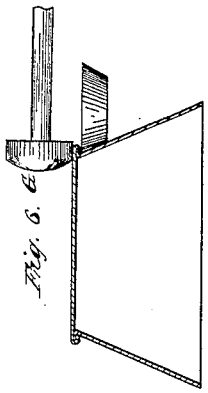
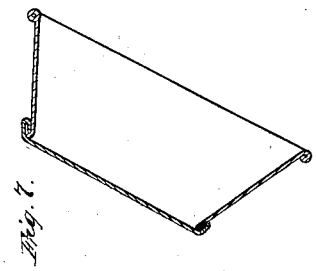
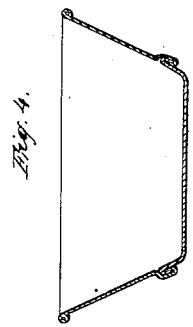
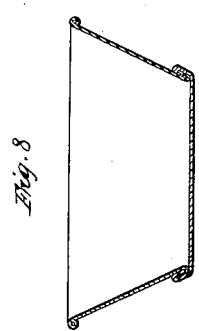
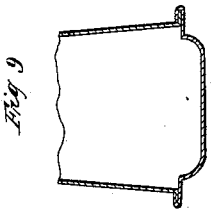
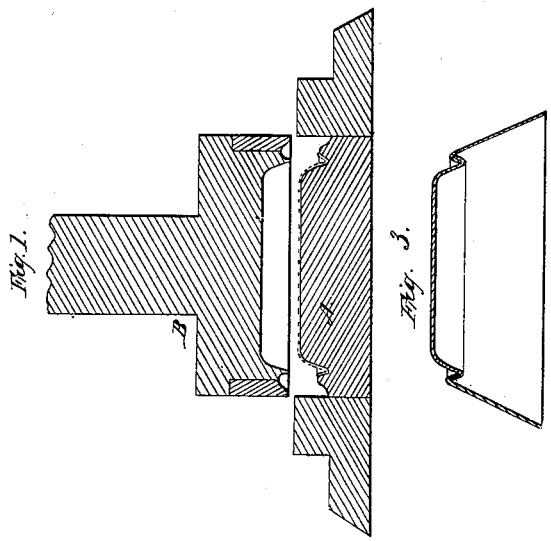
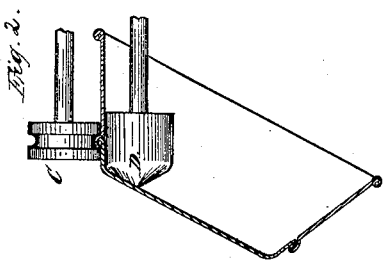

UNITED STATES PATENT OFFICE.

E. F. PARKER AND J. SMEAD, OF PROCTORSVILLE, VERMONT.

IMPROVEMENT IN THE MANUFACTURE OF TIN PANS.

Specification forming part of Letters Patent No. 16,752, dated March 3, 1857.

*To all whom it may concern:*

Be it known that we, E. F. PARKER and J. SMEAD, of Proctorsville, in the county of Windsor and State of Vermont, have invented a certain new and useful Improvement in the Manufacture of Milk-Pans; and we do hereby declare the following to be a full, clear, and exact description of the manner of doing the same, reference being had to the accompanying drawings, making a part thereof, which represent both the old plan as well as our improved manner of making these articles, and in which—

Figures 1 and 2 represent the machinery we employ in forming the lock on the pan-bottom, which is "struck up," and of seaming or uniting the lock between the side and said bottom. Fig. 3 represents in section the side and bottom of the pan as it appears before going through the seaming-rolls shown in Fig. 2. Fig. 4 represents in section our improved milk-pan when finished. Figs. 5, 6, and 7 represent the several operations that the bottoms of milk-pans as at present constructed go through before the pan is finished. Fig. 8 represents in section a pan of the common construction; and Fig. 9 represents an article of manufacture well known in the trade, which has a struck-up bottom, and is here represented to show the difference between the article we make and all others of which we have any knowledge.

Our invention consists in making a milk-pan with a struck-up bottom which is so united to the side of the pan as to not only make the pan stronger, but much more readily cleansed, and in addition to these advantages they can be packed in nests, and are made cheaper, because they have at least one operation less to go through, while they are much better than any other article for a similar purpose now known to the trade.

To enable others skilled in the art to make and use our invention, we will proceed to describe the same and the difference between it and all other things for a similar purpose in connection with the drawings.

The disks out of which the bottoms of the pans in question are made being first cut out are placed over a female die, A, and the male die B is brought down upon it by any well-known applied power, which strikes up the bottom, and at the same operation turns the lock upon it, as shown in red lines in Fig. 1.

The sides of the pans in our improved plan undergo about the same operations that those of the common construction do, with this exception in form—viz., in our plan the lock on the sides of the pan is turned on the inside of the pan, as shown in Figs. 2, 3, 4, while in the commonly-known way these locks (or, rather, flange, for the joint is different) are turned on the outer side of the pan, as shown in Figs. 6, 7, 8, and 9. The bottom and side in our improved construction being put together, as shown in Fig. 3, the pan is run through between the rolls C D, and the lock seamed down, as shown in Fig. 4. The joint is then soldered on the inside and the pan is finished.

We do not pretend to be the first to use a struck-up bottom in the manufacture of tin-ware, but do not know that a bottom has ever before been struck up and the lock made on it at one and the same operation; nor is such a bottom a mere change of form without a useful effect, for, particularly in the article of milk-pans, the elevating of the joint that unites the side and bottom facilitates the cleansing of it, and it can be kept "sweet," which is more than can be said of the pans of ordinary construction; but a more material difference consists in the strength of the pan we make over those of the ordinary make. As above stated, we turn the lock on the side of the pan on its inside. Consequently the bottom of the pan is locked onto the side from the inside also. The soldering is on the inside, too, and when the pan is filled its contents or weight of them does not tend to break away the solder, and thus produce a leak or corrosion; but the strain comes more in the line of the lock itself, which sustains it and relieves the solder from that duty.

By reference more particularly to Figs. 4, 8, the difference in the construction of the lock will be distinctly seen, those in our plan being precisely the reverse of those in the old plan.

Our milk-pan, besides being more cleanly and stronger, is made with one less operation, involving one machine less than the old or common plan, as will be hereinafter described. Besides, the seam is so locked as not to prevent the pans from being closely packed in nests for transmission, and with all these advantages is more cheaply made than the present inferior article.

Figs. 5, 6, and 7 represent the processes through which the ordinary pan-bottom goes before a pan is made by the common practice, the cutting out of the bottom being the same in both cases—first, the tools E F for turning the flange; second, the tools G H for uniting the locks of the bottom and side; and, third, the seaming-rolls I J for forming the seam. There are thus three machines required, three operations to be gone through with before the bottom and sides are united, while in our plan there are but two.

By referring to Figs. 4, 8, it will be seen that in our plan, Fig. 4, when the milk is poured into the pan, the weight, being downward, is in line with the direction of the locks or flanges, and they to a very great extent take that strain, while in the common pan, Fig. 8, the tendency of the weight downward is to break the soldering and leave an opening ruinous to a milk-pan, for it cannot be cleansed.

Fig. 9 represents a boiler which is known in the trade. It has a struck-up bottom, and in that particular alone may be said to have one of the elements of our milk-pan; but it has all the other features of common tinware, and all the objections of the pan represented in Fig. 8. It is not, moreover, struck up and the lock formed at one operation, as in our case, for such a lock as is shown in said Fig. 9 could not be formed by a die, as it could not be detached from the die if made on it. Besides, the joint in Fig. 9 is the same as in Fig. 8—viz., that anything poured into it, or any sudden jar on the bottom, comes directly on the solder, and breaks it loose, which is not the case in ours.

As to the machinery represented, we lay no claim to it in this application, having shown it merely to illustrate our invention.

Having thus fully described the nature of our invention and shown the difference between it and all other things known for a similar purpose, what we claim therein as new, and desire to secure by Letters Patent as an article of manufacture, is—

A milk-pan with a struck-up bottom, and united to the side in the manner and for the purpose herein described.

E. F. PARKER.
J. SMEAD.

Witnesses:
  GEO. L. BALCOM,
  WALTER GATES.